United States Patent [19]

Rolison et al.

[11] Patent Number: 5,296,106
[45] Date of Patent: Mar. 22, 1994

[54] ELECTRIFIED MICROHETEROGENEOUS CATALYSIS

[75] Inventors: Debra R. Rolison, Arlington, Va.; Joseph Z. Stemple, Washington, D.C.

[73] Assignee: The United States of America as represented by the Secretary of the Navy, Washington, D.C.

[21] Appl. No.: 822,812

[22] Filed: Jan. 21, 1992

[51] Int. Cl.$^5$ ............................................. C25B 3/00
[52] U.S. Cl. .................................. 204/59 R; 204/72
[58] Field of Search ............... 204/59 R, 78, 79, 80, 204/72

[56] References Cited

U.S. PATENT DOCUMENTS

| | | | |
|---|---|---|---|
| 4,162,948 | 4/1978 | Yagii et al. | 204/80 |
| 4,461,691 | 7/1984 | Frank | 204/78 |
| 4,544,450 | 10/1985 | Oberrauch et al. | 204/59 R |
| 4,707,230 | 11/1987 | Ajami | 204/59 R |
| 4,793,905 | 12/1988 | Langer et al. | 204/59 R |
| 4,846,943 | 7/1989 | Coetzer et al. | 204/68 |
| 4,931,154 | 6/1990 | Hale et al. | 204/59 R |
| 5,087,775 | 2/1992 | Gassen et al. | 568/866 |
| 5,120,807 | 6/1992 | Wei et al. | 204/59 R |
| 5,137,607 | 8/1992 | Anderson et al. | 204/59 R |

OTHER PUBLICATIONS

H. J. Kreuzer, "Physics and Chemistry in High Electric Fields", Surface Science 246, (1991), pp. 336–347.
Block et al., "Electrostatic Field Effects in Surface Reactivity: Absorption, Dissociation and Catalytic Reaction of Nitric Oxide", Surface Science 246, (1991), pp. 125–134.
Debra R. Rolison, "Zeolite-Modified Electrodes and Electrode-Modified Zeolites", Chem. Rev., 1990, 90, pp. 867–878.
Rolison et al., "Electrode-Modified Zeolite: Electrode Microstructures Contained in and on a Heterogeneous Catalyst", Journal of Physical Chemistry 1989, 93, pp. 5524–5531.
Rolison et al., "Zeolite-Supported Ultramicroelectrodes", Molecular Electronic Devices, Carter, F. L. et al. (eds), Elsevier Science Publishers, B.V. (North Holland).
De Vismes et al., "Catalytic Oxidation of Di-Terbutylphenol by Molecular Oxygen Electroassisted by Manganese-Porphyrin Fixed on Zeolite, " Nouv. J. Chem 10 (1986) 81–82.

Primary Examiner—John Niebling
Assistant Examiner—Kishor Mayekar
Attorney, Agent, or Firm—Daniel Kalish; Thomas E. McDonnell

[57] ABSTRACT

In a system and method for enhancing chemical reactions, a reactant is brought in contact with a stable, non-soluble, porous, electronically non-conductive solid (reaction enhancer) in a fluidic medium to form a reaction mixture of low ionic strength. The reaction mixture so formed is then subjected to an electrifying force thereby enhancing the chemical reaction. Reaction products are then collected.

51 Claims, 2 Drawing Sheets

ELECTRIFIED MICROHETEROGENEOUS CATALYSIS

BACKGROUND OF THE INVENTION

The present invention relates to systems and methods for electrochemical reactions and more particularly to catalysis in heterogeneous media containing a dispersed solid and a liquid phase of low ionic strength and in the presence of a low electrifying force.

In general, chemical reactions can by enhanced by manipulation of relevant local environmental conditions. The rate of the reaction might increase. This might also increase selectivity. Reactions which would otherwise have low yield or be prohibitively expensive might thus be commercially feasible.

Catalysts and enzymes substantially increase the rate of a reaction even if present in small concentrations. The mechanism for this enhancement is usually expressed in terms of reducing the activation energy of the reaction. Not all chemical reactions can be so enhanced and they are often enhanced only under a limited set of conditions.

Reactions may be enhanced by increasing the temperature or pressure. The mechanism for this enhancement is usually expressed in terms of increasing the likelihood of overcoming the activation energy. However, such enhancement may have undesirable aspects. For example, ecologically dangerous but highly stable polychlorinated biphenyls (PCBs) may be destroyed or detoxified by incineration at temperatures of between 800° and 3000° C. For such an operation, the energy costs are high and the gas and solid slag waste may still be environmentally unsafe.

Externally applied electric fields affect physical processes in electrorheological fluids, such as slurries, and are used in electrophoresis and field-flow fractionation to separate phases. Reaction rates of many chemical processes are known to be affected by the presence of an electric field, as in Friedel-Crafts, decomposition, proton-transfer reactions, and field-induced effects at surfaces. However, these applications all involve high electric field strengths of at least 1000 V/cm or even as high as several V/Å. It is undesirable to use such high fields because they might result in unwanted ionization (such as hydrolysis) or cause unwanted reactions to occur.

In electrolysis, electron transfer is a critical reaction step. Electrons are provided or removed at appropriate electrodes. Conventional electrolysis is typically carried out in media with high ionic strength, usually provided by electrolytic solutions or molten salts and with low applied voltages, typically under 2 volts. The concentration of ions and salts might be higher than that of reactants, thereby limiting desired reaction paths (or providing additional unwanted reaction paths). Furthermore, the limited voltage window in electrolysis due to the high ion and salt concentration could block desire reaction paths which might prefer larger voltage fields. In other words, certain reactions are unreachable with conventional electrolysis.

In dispersion electrolysis, metal spheres or supported-metal particles are suspended in a high-impedance medium between feeder electrodes. Due to the small size of the metal spheres and supported metal clusters, the unique properties of microelectrodes apply—electrolysis of small amounts of material in the absence of supporting electrolyte salt. However, the suspension provides for a large number of particles so that the resulting macroscopic electrode area is large; this makes it possible to electrolyze relatively large quantities of material at the ensemble of microelectrodes. Since dispersion electrolysis is a form of electrolysis, electron transfer is a critical reaction step. Dispersion electrolysis has thus far not been demonstrated for reactions other than water decomposition, hydrogen oxidation, and oxygen reduction.

SUMMARY OF THE INVENTION

It is an object of the present invention to enhance chemical reactions without requiring that the reaction environment be of high temperature or high ionic strength.

It is a further object of the present invention to enhance chemical reactions without requiring that the electrifying force be a high electric field.

It is a still further object of the present invention to enhance chemical reactions wherein electron transfer need not necessarily be a critical reaction step.

These and other objects of the present invention are achieved by bringing a reactant in contact with a stable, non-soluble, porous, electronically non-conductive solid (reaction enhancer) in a fluidic medium to form a reaction mixture of low ionic strength. The reaction mixture so formed is then subjected to an electrifying force thereby enhancing the chemical reaction. Reaction products are then collected.

DETAILED DESCRIPTION OF THE INVENTION

Figure 1:
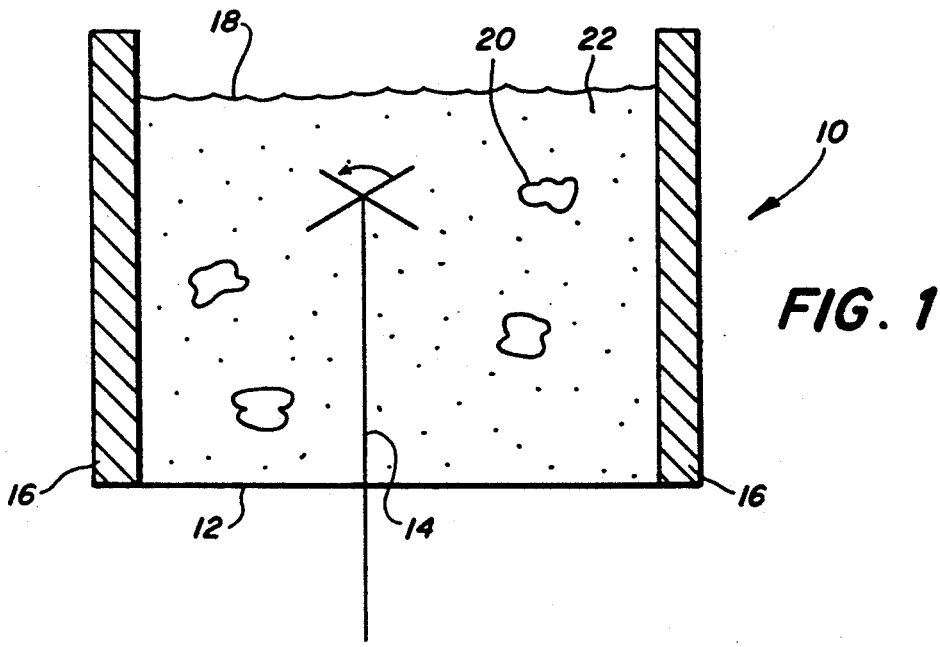
FIG. 1 shows a reactor for the practice of the present invention.

In the practice of the present invention, chemical reactions are enhanced by contacting one or more reactants with solids known as reaction enhancers in a fluidic medium of low ionic strength and in the presence of an electrifying force. The reaction enhancer of the present invention is a stable, non-soluble, porous, electronically non-conductive solid.

Stability and solubility of the reaction enhancer are determined in terms of the medium and conditions in which the invention is practiced. As used herein, a stable solid does not appreciably react with the fluidic medium. Non-soluble means that no appreciable amount of the solid dissolves in the fluidic medium. For example, $\beta$-alumina is not stable in water so it could not be used as a reaction enhancer in water. Electronic conductivity means direct current conductivity of electrons, as distinguished from ionic conductivity, and is to be avoided in order to minimize unwanted effects under the influence of the electrifying force.

The preferred class of the subject reaction enhancer is zeolites. Zeolites have high adsorption or absorption, microporosity, stability and non-solubility in water, crystallinity, and are direct current electronic insulators. Because of their pores, channels or cages, they act as molecular sieves and can distinguish between molecules interacting with them on the basis of size, shape and ionic nature. Many zeolites have a strong ionic nature and contain charge-compensating cations, typically alkali-metal or alkaline-earth, which can be ion-exchanged for other cations such as metal cations or cationic metal complexes. They can provide a high ionic strength local environment. As discussed further below, zeolites are capable of ion-activation.

In the present invention, a zeolite or other solid reaction enhancer in fluid suspension in the presence of an electrifying force has a catalytic effect.

As used herein, zeolites are defined as "crystalline molecular sieves consisting of three-dimensional frameworks composed of tetrahedrally coordinated atoms or ions bound to one another by oxygen." Kerr, G. T., "Introduction," in Flank, W. H. and Whyte, T. E., Jr., eds., "Perspectives in Molecular Sieve Science," (ACS Symposium Series 368): American Chemical Society: Washington, D.C., 1988, pg. xv., which is incorporated herein by reference. Traditional crystalline aluminosilicate zeolites, as well as substituted crystalline aluminosilicate structures, in which silicon or aluminum of a traditional zeolite is replaced by an isomorphic atom, meet this definition. For example, aluminophosphates (ALPO), silicoaluminophosphates (SAPO), and metal substituted analogues of ALPO and SAPO structures (MAPO and MAPSO, respectively), are zeolites according to this definition. These classes are explained further in Rolison, D. R., "Zeolite-Modified Electrodes and Electrode-Modified Zeolites," Chemical Review, 1990, vol. 90, pp. 867–878, which is incorporated herein by reference.

A subclass of reaction enhancer zeolites according to the present invention that are particularly important are "crystalline, hydrated aluminosilicates of group I and group II elements." Breck, D. W., "Zeolite Molecular Sieves"; Wiley: New York, 1974, pp. 4–5, which is incorporated herein by reference. These crystalline hydrated aluminosilicates have been traditionally termed zeolites.

The following zeolites can be used as reaction enhancers in the present invention:

| NAME | TYPICAL UNIT CELL CONTENTS |
|---|---|
| Faujasite | $(Na_2,K_2,Ca,Mg)_{29.5}[(AlO_2)_{59}(SiO_2)_{133}].235\ H_2O$ |
| X | $Na_{86}[(AlO2)_{86}(SiO2)_{106}].264\ H_2O$ |
| Y | $Na_{56}[(AlO_2)_{56}(SiO_2)_{136}].250\ H_2O$ |
| Chabazite | $Ca_2[(AlO_2)_4(SiO_2)_8].13\ H_2O$ |
| Gmelinite | $Na_8[(AlO_2)_8(SiO_2)_{16}].24\ H_2O$ |
| ZK-5 | $(R,Na_2)_{15}[(AlO_2)_{30}(SiO_2)_{66}].98\ H_2O$, where R = [1,4-dimethyl-1,4-diazoniabicyclo (2,2,2) octane]$^{2+}$ |
| L | $K_9[(AlO_2)_9(SiO_2)_{27}].22\ H_2O$ |
| Natrolite | $Na_{16}[(AlO_2)_{16}(SiO_2)_{24}].16\ H_2O$ |
| Scolecite | $Ca_8[(AlO_2)_{16}(SiO_2)_{24}].24\ H_2O$ |
| Mesolite | $Na_{16}Ca_{16}[(AlO_2)_{48}(SiO_2)_{72}].64\ H_2O$ |
| Thomsonite | $Na_4Ca_8[(AlO_2)_{20}(SiO_2)_{20}].24\ H_2O$ |
| Gonnardite | $Na_4Ca_2[(AlO_2)_8(SiO_2)_{12}].14\ H_2O$ |
| Edingtonite | $Ba_2[(AlO_2)_4(SiO_2)_6].8\ H_2O$ |
| Mordenite | $Na_8[(AlO_2)_8(SiO_2)_{40}].24\ H_2O$ |
| Dachiardite | $Na_5[(AlO_2)_5(SiO_2)_{19}].12\ H_2O$ |
| Ferrierite | $Na_{1.5}Mg_2[(AlO_2)_{5.5}(SiO_2)_{30.5}].18\ H_2O$ |
| Epistilbite | $Ca_3[(AlO_2)_6(SiO_2)_{18}].18\ H_2O$ |
| Bikitaite | $Li_2[(AlO_2)_2(SiO_2)_4].2\ H_2O$ |
| A | $Na_{12}[(AlO_2)_{12}(SiO_2)_{12}].27\ H_2O$ |

These examples are explained further in Table 2.4 of Breck, supra, pg. 49, which is incorporated herein by reference. Further examples of zeolites which are effective as reaction enhancers in the present invention may be found in Breck, supra, which is incorporated herein by reference.

The preferred zeolites for use as reaction enhancers are faujasites and faujasite-type structures (see Breck, supra at p. 92), such as zeolites X and Y as well as the closely related zeolite A. It is believed that such zeolites are effective because they have a 3-dimensional porosity with cages and channels. The invention has also been demonstrated for 2-dimensionally porous synthetic mordenite (another zeolite), and non-3-dimensionally porous zeolite L.

Zeolite crystals are generally of sub-micrometer to micrometer size. Reaction enhancers according to the present invention can be of any size, although it is preferred that they be of sub-micrometer to micrometer size.

Other types of material which can be used as reaction enhancers, if they are stable, non-soluble, porous, and electronically non-conductive solids, are organic compounds, such as polymers, and inorganic materials, such as metallocyano-derived lattices, borides, phosphides, nitrides, carbides, and silicides, and compounds and mixtures thereof.

Substances selected from the group consisting of aluminum oxide, silicon oxide, oxides of transition metals, and compounds and mixtures thereof, which are stable, non-soluble, porous, electronically non-conductive solids can also be used as reaction enhancers according to the present invention. For example, $\gamma$-alumina, kaolin (an aluminosilicate that is not a zeolite), silica, and mixtures thereof can be used as reaction enhancers. The following materials have been successfully used: $\gamma$-alumina, kaolin, and silica. $\alpha$-alumina is a further example of a reaction enhancer according to the present invention.

The medium in which the reaction occurs is fluidic. For example, it can be a gas, a liquid, or a supercritical fluid. The preferred medium is liquid and the most preferred is aqueous (containing at least some water).

The fluidic medium should be relatively free of contaminants, and of low ionic strength so as to minimize unwanted ions which might obscure the desired reaction, and so as to minimize unwanted current when the electrifying force is applied. As used herein, ionic strength is a measure of the concentration of ions in solution. Water generally has ionic strength of under $10^{-6}$ molar. Ionic strength of under 0.025 molar suffices, preferably under 0.005 molar.

The use of a reaction enhancer in the present invention does not preclude the use of other additional catalysts or catalytic systems. They may be added to further increase the reaction rate or the selectivity of the reaction, which is especially desirable in synthesis reactions. A reaction catalyst or catalytic system may be supported on the reaction enhancer. Such a supported catalyst or catalytic system is preferably electronically nonconductive, so as to avoid dispersion electrolytic effects which might interfere with operation of the invention.

The fluidic medium may also be mixed with other additives. For example, one or more surfactants, wetting agents, emulsifying agents, and solvents, such as acetone, might be added.

The fluidic medium-reactant-reaction enhancer reaction mixture (the reaction mixture) remains at low ionic strength, as that term was defined earlier.

The electrifying force can be any electrifying force known in electrochemistry, such as applied electric potential, electric field, or current. All of these quantities can be fixed or varied, and some or all of them can be controlled.

It is preferable to control the electric field or the potential across the reaction mixture rather than the current. The potential can be adjusted to optimize the reaction being studied—different reactions work best at different potentials. Typically, the average electric field across the reaction mixture is kept under 1000 V/cm, and preferably, under 250 V/cm to avoid unwanted ionization and currents. Alternatively, the total potential drop across the reaction mixture is kept under 1000 V and preferably, under 100 V. At large voltages, the reaction enhancer may become bound to the electrodes. The potential drop outside of the reaction mixture could be greater, for example, 6,000 V, but only the potential drop across the reaction mixture is relevant herein.

Alternatively, the current through the reaction mixture is kept at no greater than 2 Amp or the current density is kept at no greater than 10 mA/cm$^2$. Limiting the current through the reaction mixture is important for several reasons. Firstly, high currents might heat the reaction mixture, thereby altering the reaction conditions and possibly causing reaction runaway. Secondly, high currents might interfere with the desired reactions by forming and encouraging undesirable reactions.

There is no minimum (threshold) current—the process will effectively work without any current at all. Average electric fields across the reaction mixture which are significantly less than molecular electric fields (on the order of 1 V/Å) are effective. Preferably, the electric field is at least 2.5 V/cm. In the most preferred embodiment, it is always at least 25 V/cm. Preferably, the potential across the reaction mixture is at least 1 V and most preferably, at least 10 V. For each reaction, the optimal minimum (threshold) potential or electric field, are to be empirically determined.

The electrifying force can be provided by a means external to the reaction mixture, or by electrodes in contact with the reaction mixture. The latter is preferable since much of the potential drop might otherwise occur outside of the reaction mixture.

It is feasible to use any of the materials known in electrochemistry as electrodes. However, material, such as nickel or lead, which oxidizes easily would probably not be effective—it might go into the reaction mixture as ions. Electrodes containing material selected from the group consisting of platinum, gold, stainless steel, graphite, titanium, titanium oxide, ruthenium oxide, tantalum, and alloys, combinations and mixtures thereof are preferred. Films, especially platinum, can be used on the electrodes. The best results have been obtained with electrodes that are at least 50% platinum, and stainless steel has also been found effective. Excellent results have been obtained with a Nafion ® (1100 equivalent weight) coating on the cathode. Nafion ® is a DuPont product which contains a selective path for ions and is water-permeable. Any electrode coating (on either or both electrodes) which provides a path for ions, and especially one which is water-permeable, can be used.

If a liquid reaction medium is selected, the reaction is preferably carried out in a reactor 10 shown in FIG. 1. Reactor 10 comprises a reaction chamber 12, contacting means 14, electrifying force means 16, and removal means (not shown) for removing a product (not shown).

The invention is practiced by introducing the fluidic medium 18, reaction enhancer 20, reactant 22, and any additives (not shown) to said reaction chamber 12. The reactant 22 and reaction enhancer 20 are brought into contact with each other by contacting means 14 to form a reaction mixture. The reaction mixture is subjected to an electrifying force by electrifying force means 16 to produce at least one product. The product is removed from the reactor.

The contacting means 14 is means for providing contact between the reactant 22 and the reaction enhancer 20. As an example, the contacting means 14 can be a gas- or liquid-phased fluidized bed reactor containing the reaction enhancer 20 so that the reactant 22 can be passed through the fluidized bed reactor.

In the preferred embodiment, the contacting means 14 is a means for uniformly dispersing the reactant 22 and reaction enhancer 20, in suspension or otherwise, in the fluidic medium 18, and bringing the reactant 22 and reaction enhancer 20 in contact with each other to form a reaction mixture. For example, the dispersion means can be means for passing a gas through the reaction mixture, pumping or recirculating the reaction mixture, using an ultrasonicator, or mixing, such as by mechanical stirring, magnetic stirring, or other forms of agitation. The external material providing the dispersion, such as the gas, the blades or other mixing means, may be inert, or may take part in the reaction.

In one embodiment, the electrifying force means 16 includes a means for measuring the current through said reaction mixture, which current is generally indicative of the progress of chemical reactions in the reaction mixture.

Typically, the reaction mixture formed by bringing at least one reactant 22 in contact with the reaction enhancer 20 in a fluidic medium 18 is a slurry. This slurry is usually a heterogeneous medium containing a dispersed solid (the reaction enhancer 20) and one or more liquid-phases. In other words, it is a multiphasic system in which at least one of the phases has a structure on the sub-micrometer to micrometer scale.

The reaction mixture is of low ionic strength so as to minimize unwanted ions which might obscure the desired reaction, and so as to minimize unwanted background current under the influence of the electrifying force.

The optimum range of temperatures and pressures under which the invention is carried out are to be empirically determined. Under the ideal conditions, a balance is found between solubility, reaction rate, current, and volatility, all of which generally increase with increased temperature. It is preferable that the conditions be such that the fluidic medium is liquid, which for water at 1 atm, is between 0° C. and 100° C. In the preferred embodiment, the pressure is about 1 atm and the temperature is between about 0° C. and about 50° C. In a preferable embodiment, the temperature is below about 20° C. In a still more preferable embodiment, the temperature is below about 10° C.

The concentration of reaction enhancer should be such that it does not appreciably increase the viscosity of the reaction mixture. High viscosity affects transport mechanism and current. In the preferred embodiment, the molar concentration of the reaction enhancer is in the range of about $10^{-4}$ to about $10^{-2}$ that of the reactant In the most preferred embodiment, it is about $10^{-3}$ that of the reactant. Typically, the reactant concentration is in the range of about $10^{-4}$ to about $10^{-1}$M. In the most preferred embodiment, it is about $10^{-3}$M.

The amount of time for running the operation is to be empirically determined.

In the preferred embodiment, this invention is practiced by activating the reaction enhancer 20 with the fluidic medium 18 before bringing the reactant 22 and the reaction enhancer 20 in contact with each other. In particular, the reaction enhancer 20 is first dispersed in the fluidic medium 18, thereby forming a preactivation mixture. The preactivation mixture is then activated by maintaining it (and continuing the dispersion of reaction enhancer 20 in it) for sufficient time to reach ionic equilibrium at low ionic strength, thereby forming an activated mixture. Activation may take hours for zeolites, for example. The reactant 22 is then dispersed in said activated mixture and the reactant 22 and the reaction enhancer 20 are brought in contact with each other to form the reaction mixture. The reaction mixture is of low ionic strength.

The activated mixture or reaction mixture, as well as the fluidic medium 18, can contain catalysts or other additives, such as surfactants, wetting agents, emulsifying agents, and solvents, such as acetone. The activated mixture must be of low ionic strength, as defined earlier.

Activation affects not only the reaction enhancer 20 but the fluid in which it is dispersed. Accordingly, the activated mixture, and not just the reaction enhancer 20, is activated. The activated mixture must, of course, have low ionic strength (low solutional ionic concentration).

Activation of preactivation mixtures may be by ion-activation. In ion-activation, the thermodynamic process of reaching ionic equilibrium is achieved by application of an electrifying force. Ion-activation substantially speeds up the process—ionic equilibrium may be reached in minutes, rather than hours. Furthermore, although an activated mixture activated without application of an electrifying force and an activated mixture activated by ion-activation might have the same measurable ionic concentrations, the ion-activated mixture is often capable of greater ohmic currents and often results in reaction mixtures with greater ability to enhance reactions.

In general, an ion-activated mixture remains activated for a period of time after the electrifying force is turned off. Typically, it can be used as an activated mixture as much as an hour later.

Ion-activation is typically practiced by applying the electrifying force to the preactivation mixture by electrifying force means 16 under the same conditions and with the same limitations as application of the electrifying force means 16 to the reaction mixture.

The electrifying force means 16 typically has means for measuring the current through said preactivation mixture, activated mixture, and reaction mixture, which current is indicative of the reactions occurring in the preactivation mixture, activated mixture, and reaction mixture.

The following alkali metal zeolites have been shown to ion-activate across electrodes with applied potential differences of 10 to 100 volts, (25–250 V/cm average electric fields across the preactivation mixture): NaY, LiY, KY, RbY, CsY, synthetic sodium-compensated mordenite (NaLZ-M), KL, 1% Pt⁰-NaY, 5% Pt⁰-NaY and 10% Pt⁰-NaY, NaA, NaX, and Pd$^{II}$Cu$^{II}$-NaY. In addition, HY, CaY, and NH$_4$Y have been shown to ion-activate.

Figure 2:
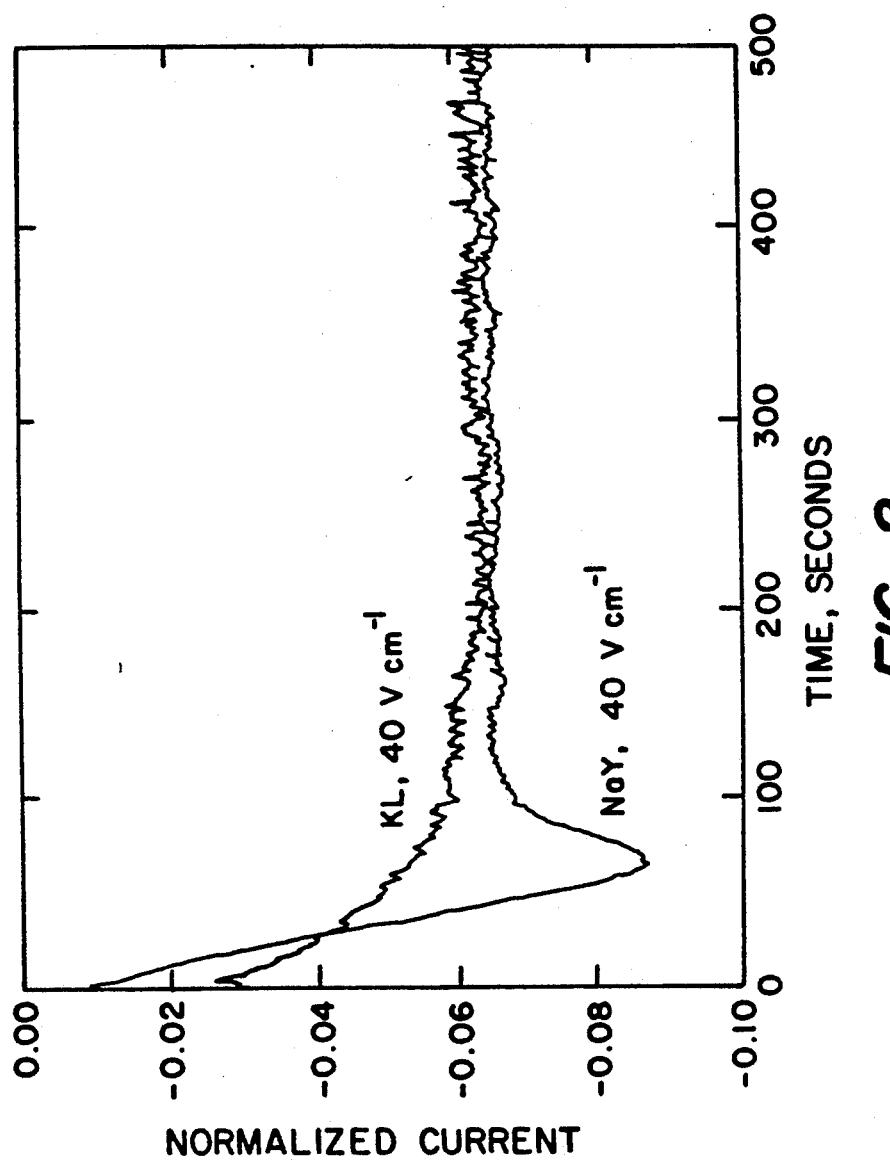
FIG. 2 is a current-time profile of ion-activation.

NaY is the prototypical ion-activating reaction enhancer 20. Current is considered indicative of the ionic state, although in general it need not be so. The current through the NaY aqueous preactivation mixture typically rises until reaching a peak after about 1 minute. The current then typically declines to steady state several minutes later, forming an activated mixture. A current-time profile of such a response is shown in FIG. 2. However, ion-activation need not involve such a peak. For example, as also shown in FIG. 2, KL may ion-activate without the peak.

This invention is broadly effective in enhancing all chemical reactions. In particular, it is effective for oxidation, reduction, dehalogenation, decomposition. For organic reactants and in particular, for reactants containing at least one aromatic ring, it is particularly effective for hydrogenation, substitution, elimination, and decomposition.

The copending applications by inventors Debra R. Rolison and Joseph Z. Stemple entitled "Oxidation of Organic Materials by Electrified Microheterogeneous Catalysis," and "Decomposition of Halogenated and Polyhalogenated Organic Materials by Electrified Microheterogeneous Catalysis," which applications are filed on the same day that this application is filed, are incorporated herein by reference.

EXAMPLES

Having described the invention in general, the following examples are given as particular embodiments thereof and to demonstrate the practice and advantages thereof. It is understood the examples are given by way of illustration and are not intended to limit the specification or the claims to follow in any manner.

EXPERIMENTAL APPARATUS

Figure 3:
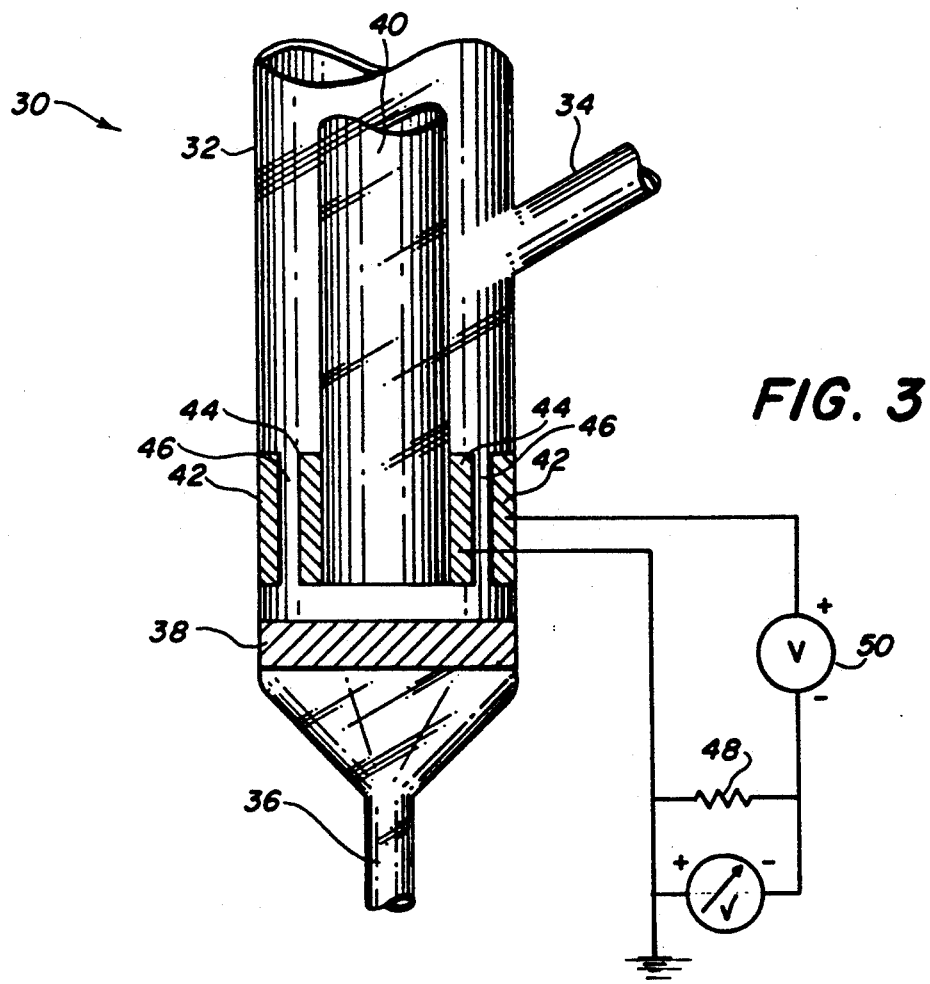
FIG. 3 shows the reactor used in the examples.

All of the following examples were performed using the reactor shown in cross-section in FIG. 3. This reactor (30) is based on a cylindrical outer tube (32) with a side arm (34), the bottom of which cylindrical tube opens onto a tube (36) for inflow of gas. The bottom part of the tube above the inflow tube is sealed with a glass frit (38) of medium porosity. An inner hollow cylindrical tube (40), sealed shut at the bottom but open on the top, is nested into the outer tube when the apparatus is assembled. The outer electrode (42) is a 5-cm wide platinum foil welded into a cylinder and fitted around the inner wall of the outer tube (32). The inner electrode (44) is a 5-cm wide platinum foil welded in a cylindrical form about the outer surface of the inner tube (40). The dimensions of the apparatus are chosen so that when the inner tube (40) is inserted in the outer tube (32), a toric area between the outer electrode (42) and the inner electrode (44) is formed, which toric area is 5 cm high, with a gap of about 0.4 cm and constitutes the dispersion cell (46). The diameters of the outer electrode (42) and inner electrode (44) are about 3.0 cm and 2.2 cm, respectively. These feeder electrodes (42,44) have surface areas of about 85 cm² in contact with fluid in the dispersion cell (46).

When this experimental apparatus is used in the practice of the present invention, the outer electrode (42) is maintained at positive potential with respect to the inner electrode (44) at ground, and they are anode and cathode, respectively. A d.c.-power supply (Kepco Model JQE or Sorensen Model DCR-600-1.5B) (46) is used to so apply and maintain the voltage across the electrodes. The cell current is determined from the voltage drop measured across a 10.2 Ω, 160-watt resistor (48) in series with the cell.

The reaction enhancer and fluidic medium are combined in a vessel, shaken into slurry form, and then put in the dispersion cell (46).

Dispersion in the liquid medium is maintained by gas flow through tube (36) and through the frit (38) at the base of the dispersion cell (46) at the rate of about 80–240 mL/min. The gas flow remains on from about the time the reaction enhancer - fluidic medium slurry is put in the dispersion cell (46) until the time the dispersion cell (46) contents are removed. The gas may be an inert/non-reactive gas, such as helium, or one of the necessary reactants or a combination of both types of gases in order to control or vary the concentration of the reactant gas(es).

Temperatures in the dispersion cell are monitored with a thermometer immersed in silicone oil placed inside the inner cylindrical tube (40).

NaY zeolite used in the following examples was obtained in powder form from Strem. To assure a constant weight, it was used in fully hydrated form by water equilibrating it in an all-glass or plastic chamber over saturated $NH_4Cl$ solution. In other words, this zeolite powder was stored for at least a day in such a closed chamber containing a saturated aqueous solution of ammonium chloride.

The reaction enhancer is activated to form an activated mixture, by dispersing it in 18 Mohm-cm distilled, filtered and deionized water in the cell and then applying a voltage with low potential gradient across the electrodes while dispersion continues. The current flowing between the electrodes is monitored until it reaches a steady state, which usually occurs after about 5 to 10 minutes, depending on the actual conditions. The voltage is then turned off.

The organic compounds, reagents, reactants, and additional catalysts, if any, are then added to the activated mixture in the dispersion cell (46) without an applied potential, and dispersed to form the reaction mixture. The reaction is "run" by applying a voltage with low potential gradient across the electrodes simultaneously with the continuing dispersion for sufficient time to form the reaction products.

The cell can be run with the downstream gas phase trapped in a low temperature trap, such as dry ice/acetone or liquid nitrogen, trapped in a bomb, or recycled into the dispersion cell for complete reaction, such as by pressurizing the cell or using an internal cold finger to condense the volatilized material. The trap (not shown) is coupled to side arm (34). After the reaction is run, the voltage across the electrodes is turned off. The liquid and the trapped gases are removed from the cell and the trap, respectively, and analyzed to determine the identity and quantity of product and unreacted reactant. This analysis is performed by traditional analytical methods such as gas chromatography (with or without mass spectrometric detection), infrared spectroscopy, ion chromatography, liquid chromatography, or $^1H$ nuclear magnetic resonance spectroscopy.

In examples 2a, 2b, 2c, 2d, and 3 below, only the cell contents were analyzed. They were transferred to a separatory funnel and extracted three times with diethyl ether. The ether and aqueous layers were separated. Zeolites were filtered from the aqueous phase by vacuum filtration. This remaining phase was examined for appearance and tested for frothing when shaken. It was checked for chloride ion with the $AgNO_3$ test (precipitation of AgCl). The ether layer (non-aqueous phase) was dried over magnesium sulfate ($MgSO_4$) and filtered, and the excess ether was removed with a rotoevaporator.

Example 1a

Selective partial oxidation of alkenes and, in particular, oxidation of propylene to acetone, by the mixed catalytic system of palladium (II) and copper (II) in the presence of oxygen and water.

In this example, a water jacket (not shown) surrounded the reactor (30) to control its temperature. The water jacket was maintained at $-1°$ C.–$0°$ C. The electrodes were platinum.

NaY zeolite as prepared above was ion-exchanged first in an aqueous solution of $PdCl_2/NH_4OH$ (to a weight loading of 1%), and then in an aqueous solution of $CuCl_2$ (6.5 weight %), to form a $Pd^{II}Cu^{II}Y$ powder. 53.6 mg of this zeolite powder was added to 20 mL of water and put in the dispersion cell. At about the time this preactivation mixture was put in the dispersion cell, a gas flow of 67 mL/min helium was turned on.

After the zeolite dispersed, thus forming the preactivation mixture, an 80 V activation voltage was applied. The current peaked at 343 mA after about 60 sec, and then dropped to 44 mA steady-state current, thus forming the activated mixture. The voltage was then turned off.

The gas flow was then altered to 37 mL/min propene + 20 mL/min oxygen + 28 mL/min helium. The reaction was then "run" by applying 20 V for 60 minutes. The current rose from an initial 5.9 mA to 8.8 mA after 60 minutes. The voltage was then turned off and the cell contents were removed.

After filtration, the aqueous phase was stored in airtight glass vials sealed with a teflon-coated septum; these samples were then stored at $4°$ C. until analyzed by gas chromatography or gas chromatography - mass spectrometry. Products were quantitated by comparison to standard solutions of authentic compound material. Analysis showed the following products: acetone - 5.2 $\mu$mol (76% selectivity), propionaldehyde - 0.18 $\mu$mol (3% selectivity), propylene oxide - 1.38 $\mu$mol (20% selectivity), and acetaldehyde - 0.094 $\mu$mol (1% selectivity). The acetone to propionaldehyde ratio (mol/mol) was 29.

No products were found in the bomb. Therefore, all products were in the aqueous phase, and none were in the gas phase.

Without application of the potential and under these conditions, no products formed.

Example 1b

Selective partial oxidation of alkenes and, in particular, oxidation of propylene to propylene oxide, by the mixed catalytic system of palladium (II) and copper (II) in the presence of oxygen and water.

In this example, a water jacket (not shown) surrounded the reactor (30) to control its temperature. The water jacket was maintained at $-1°$ C.–$0°$ C. The electrodes were platinum.

NaY zeolite as prepared above was ion-exchanged in an aqueous solution of $PdCl_2/NH_4OH$ (to a weight loading of 1%). It was then dried at $100°$ C. and calcined in flowing oxygen at $300°$ C. for about 2 hours. This material was then ion-exchanged in an aqueous solution of $CuCl_2$ (6.5 weight %), to form a $Pd^{II}Cu^{II}Y$ calcined powder. 55.0 mg of this calcined zeolite powder was added to 20 mL of water and put in the dispersion cell. At about the time this preactivation mixture was put in the dispersion cell, a gas flow of 100 mL/min helium was turned on.

After the zeolite dispersed, thus forming the preactivation mixture, an 80 V activation voltage was applied. The current peaked at 270 mA after about 48 sec, and then dropped to 46 mA steady-state current, thus forming the activated mixture. The voltage was then turned off.

The gas flow was then altered to 30 mL/min propene+27 mL/min oxygen+31 mL/min helium. The reaction was then "run" by applying 30 V for 60 minutes. The current peaked on 4 regularly occurring occasions at 12 mA, and then reached 8.8 mA steady-state current at about 45 minutes. After the reaction was run, the voltage was turned off and the cell contents were removed.

Analysis showed the following products: propylene oxide - 2.4 μmol (71% selectivity), acetone - 0.4 μmol (12% selectivity), propionaldehyde - 0.36 μmol (11% selectivity), and acetaldehyde - 0.22 μmol (7% selectivity). The propylene oxide to acetone ratio (mol/mol) was 6.

No products were found in the bomb. Therefore, all products were in the aqueous phase, and none were in the gas phase.

Without application of the potential and under these conditions, no products formed.

Example 2a

Dechlorination and deoomposition of chlorobenzene.

In this example, a water jacket (not shown) surrounded the reactor (30) to control its temperature. The water jacket was maintained at −1° C.–0° C. The electrodes were platinum. Dispersion was provided by a 140–160 mL/min flow of helium.

53.4 mg of NaY zeolite powder prepared as above was added to 20 mL of water and put in the dispersion cell to form a zeolite suspension density of 2.67 mg/mL. After the zeolite dispersed, thus forming the preactivation mixture, a 30 V activation voltage was applied. The current peaked at 380 mA after about 40 sec, and then dropped to 270 mA steady-state current over about 5 minutes, thus forming the activated mixture. The voltage was then turned off.

0.1 mL of neat chlorobenzene, used as received, was then added to the activated mixture in the dispersion cell. After it dispersed (about 5 minutes after addition to the dispersion cell), thereby forming the reaction mixture, 30 V was applied. The current and temperature rose until after about 6 minutes, the current was greater than 300 mA and the temperature was higher than 5° C. At that point, the voltage was lowered to 20 V and applied at that level for 84 additional minutes, for a total reaction run time of 90 minutes. The voltage was then turned off. The contents of the dispersion cell dramatically changed color as the reaction was run.

The aqueous phase had a yellow-brown color, and frothed when shaken, indicating surfactancy caused by the presence of nonchlorobenzene organic species. The AgNO$_3$ test for chloride was positive, indicating the presence of chloride ions. The presence of chloride ions was confirmed by ion chromatography. Chlorobenzene, the reactant, does not give a positive chloride test.

When no electric voltage is applied or no reaction enhancer is used under the above conditions, the aqueous phase is colorless, shows minimal frothing, and has negligible chloride, indicating that no reaction has occurred.

The ether extract evaporated to dryness.

Example 2b

Partial dechlorination of chlorobenzene and oxidation of benzene and unreacted chlorobenzene.

In this example, the reactor was not jacketed. It rested in an ice-water bath and was maintained at 1°–10° C. The electrodes were platinum and the inner (ground) electrode had a Nafion ® film: coated on it by dipping the electrode in a dilute solution of solubilized Nafion ®, removing it, and letting it air-dry/evaporate. Dispersion was provided by a 140–160 mL/min flow of helium.

50.8 mg of γ-alumina ($Al_2O_3$) powder, used as received from Aesar, was added to 20 mL of water and put in the dispersion cell to form a reaction enhancer suspension density of 2.540 mg/mL. After the alumina dispersed, thus forming the preactivation mixture, a 30 V activation voltage was applied. The current did not peak, but reached 5 mA steady-state current over about 5 minutes, thus forming the activated mixture. The voltage was then turned off. This ion-activation procedure may have been superfluous because of the minimal steady-state current.

0.1 mL of neat chlorobenzene, used as received, was then added to the activated mixture in the dispersion cell. After it dispersed (about 5 minutes after addition to the dispersion cell), thereby forming the reaction mixture, 30 V was applied. The current and temperature rose until after about 5 minutes, the current was greater than 400 mA and the temperature was higher than 7° C. At that point, the voltage was lowered to 20 V and applied at that level for 70 additional minutes, for a total reaction run time of 75 minutes. The voltage was then turned off. The contents of the dispersion cell dramatically changed color as the reaction was run.

The aqueous phase had a brown color. There was only minimal frothing when shaken. The AgNO$_3$ test for chloride was positive, indicating the presence of chloride ions, as confirmed by ion chromatography.

When no electric voltage is applied or no reaction enhancer is used under the above conditions, the aqueous phase is colorless, shows minimal frothing, and has negligible chloride, indicating that no reaction has occurred.

The ether extract was yellow and evaporated to a yellow oil. Gas chromatography-mass spectrometry analysis showed 8 products The major identified products were chlorobenzene, chlorobenzoquinone, and benzoquinone. Also present were chloro-(1,3)-benzenediol, chloro-(1,2)-benzenediol, and 1,2-benzenediol. There were also 2 unidentified products.

These results are indicative of partial dechlorination of chlorobenzene to benzene and oxidation of benzene and unreacted chlorobenzene to diols and quinones.

Example 2c

Partial dechlorination of chlorobenzene and oxidation of benzene and unreacted chlorobenzene.

In this example, the reactor was not jacketed. It rested in an ice-water bath and was maintained at 1°–10° C. The electrodes were platinum and the inner (ground) electrode had a Nafion ® film prepared as above. Dispersion was provided by a 140–160 mL/min flow of helium.

51.9 mg of kaolin powder, used as received from J. T. Baker, was added to 20 mL of water and put in the dispersion cell to form a reaction enhancer suspension density of 2.595 mg/mL. After the kaolin dispersed, thus forming the preactivation mixture, a 30 V activation voltage was applied. The current did not peak, but reached 70 mA steady-state current, thus forming the activated mixture. The voltage was then turned off.

0.1 mL of neat chlorobenzene, used as received, was then added to the activated mixture in the dispersion cell. After it dispersed, thereby forming the reaction mixture, 30 V was applied. The current and temperature rose until after about 5-10 minutes, the current was greater than 400 mA and the temperature was higher than 6° C. At that point, the voltage was lowered to 20 V and applied at that level for a total reaction run time of 80 minutes. The voltage was then turned off. The contents of the dispersion cell dramatically changed color as the reaction was run.

The aqueous phase had a light yellow color. There was slight frothing when shaken. The $AgNO_3$ test for chloride was positive, indicating the presence of chloride ions, which was confirmed by ion chromatography.

When no electric voltage is applied or no reaction enhancer is used under the above conditions, the aqueous phase is colorless, shows minimal frothing, and has negligible chloride, indicating that no reaction has occurred.

The ether extract was yellow and evaporated to a yellow oil. Gas chromatography - mass spectrometry analysis showed 1 unidentified and 8 identified products. The major identified products were chlorobenzene, chlorobenzoquinone, and benzoquinone. Also present were chloro-(1,2)-benzenediol, chloro-(1,3)-benzenediol, 1,2-benzenediol, 1,3-benzenediol, and 2-methyl-2-pentenal.

These results are indicative of partial dechlorination of chlorobenzene to benzene and oxidation of benzene and unreacted chlorobenzene to diols and quinones.

Example 2d

Partial dechlorination of chlorobenzene and oxidation of benzene and unreacted chlorobenzene.

In this example, the reactor was not jacketed. It rested in an ice-water bath and was maintained at 1°-10° C. The electrodes were platinum and the inner (ground) electrode had a Nafion ® film prepared as above. Dispersion was provided by a 140-160 mL/min flow of helium.

0.191 g of silica ($SiO_2$) powder, used as received from Aldrich, was added to 20 mL of water and put in the dispersion cell to form a reaction enhancer suspension density of 9.550 mg/mL. After the silica dispersed, thus forming the preactivation mixture, a 30 V activation voltage was applied. The current did not peak, but reached 35 mA steady-state current, thus forming the activated mixture. The voltage was then turned off. This ion-activation procedure may have been superfluous because of the minimal steady-state current.

0.1 mL of neat chlorobenzene, used as received, was then added to the activated mixture in the dispersion cell. After it dispersed, thereby forming the reaction mixture, 30 V was applied. The current and temperature rose until after about 34 minutes, the current was greater than 600 mA and the temperature was higher than 20° C. At that point, the voltage was lowered to 15 V and applied at that level for a total reaction run time of 65 minutes. The voltage was then turned off. The contents of the dispersion cell dramatically changed color as the reaction was run.

The aqueous phase had a light yellow color. There was minimal frothing when shaken. The $AgNO_3$ test for chloride was positive, indicating the presence of chloride ions, which was confirmed by ion chromatography.

When no electric voltage is applied or no reaction enhancer is used under the above conditions, the aqueous phase is colorless, shows minimal frothing, and has negligible chloride, indicating that no reaction has occurred.

The ether extract was yellow and evaporated to a yellow oil. Gas chromatography-mass spectrometry analysis showed 2 unidentified and 6 identified products. The major identified product was chlorobenzene. Also present were chloro-(1,3)-benzenediol, chloro-(1,2)-benzenediol, chlorobenzoquinone, benzoquinone, and 1,2-benzenediol.

These results are indicative of partial dechlorination of chlorobenzene to benzene and oxidation of benzene and unreacted chlorobenzene to diols and quinones.

Example 3

Dechlorination and decomposition of polychlorinated biphenyl (PCB) and in particular, Aroclor ® 6050, which consists of multiple polychlorinated terphenyl congeners. Typically, destruction of Aroclor ® 6050 does not occur at temperatures lower than 1600° C.

In this example, the reactor was not jacketed. It rested in an ice-water bath and was maintained at 1°-10° C. The electrodes were platinum. Dispersion was provided by a 180-240 mL/min flow of helium.

55.9 mg of NaY zeolite powder prepared as above, was added to 15 mL of acetone and 5 mL of water and put in the dispersion cell to form a zeolite suspension density of 2.795 mg/mL. After the zeolite dispersed, thus forming the preactivation mixture, a 30 V activation voltage was applied. The current peaked, then dropped to steady state, thus forming the activated mixture. The voltage was then turned off.

0.2 mL of neat Aroclor ® 6050, used as received, was then added to the activated mixture in the dispersion cell. After it dispersed, thereby forming the reaction mixture, 30 V was applied. After about 38 minutes, the current began to increase and the cell contents began frothing and darkening. At that point, the voltage remained at the same 30 V level for 84 additional minutes, for a total run time of 134 minutes. The voltage was then turned off.

The aqueous phase had a dark yellow-green color. After filtration, it was a fine suspension. It showed good frothing when shaken, and the chloride test was positive. The presence of chloride ions was confirmed by ion chromatography. In other words, it contained chloride ion and organic species which were not PCBs.

The ether extract was a dark violet-brown oil. Gas chromatography - mass spectrometry analysis of it showed an almost complete loss of all the original components with minimal levels remaining and with the addition of many new unidentified low molecular weight products. The absence of reactant in the nonaqueous ether extract indicates that it reacted in that PCBs and polychlorinated terphenyls would not have been lost through evaporation. Infrared spectroscopic analysis (relative to starting material) showed a loss of aryl bands, the appearance of esteric, carboxylic and alcoholic bands, and the near-total loss of the phenyl-phenyl bond moiety of the terphenyl. $^1$H-nuclear magnetic resonance analysis (relative to starting material) showed the loss of aryl protons and the appearance of alkyl protons. The infrared and NMR analyses showed the creation of signals consistent with alkyl and esteric groups and the NMR analysis showed the loss of the proton signal due to phenyl rings.

Decomposition of Aroclor ® 6050 under these conditions does not occur unless there is both the NaY zeolite and an applied potential. For example, even after 29 hours of refluxing at 57° C. with NaY, the aqueous phase was colorless, had minimal frothing after shaking, and showed only a trace of AgCl precipitate. The extracted nonaqueous phase was a viscous straw-yellow oil, which was the color and viscosity of the starting material. The contents did not change color during this entire time.

Example 4

Dechlorination and defluorination of chlorofluorocarbons (CFCs) and in particular, 1,1,2-trichlorotrifluoroethane (Freon ® 113). As based on this invention, destruction of Freon ® 113 occurs at temperatures substantially lower than otherwise required for destructive incineration (above 500° C.).

In this example, the reactor was not jacketed. It rested in an ice-water bath and was maintained at 1°–5° C. The electrodes were platinum. Dispersion was provided by a 100–140 mL/min flow of helium.

56.6 mg of NaY zeolite powder prepared as above was added to 20 mL of water and put in the dispersion cell to form a zeolite suspension density of 2.830 mg/mL. After the zeolite dispersed thus forming the preactivation mixture, a 20 V activation voltage was applied. The current peaked at 270 mA after about 80 seconds, then dropped to 200 mA steady state, thus forming the activated mixture. The voltage was then turned off. A dry ice-acetone gas-phase trap was prepared before running the reaction.

1.0 mL neat 0.42M Freon ® 113, used as received, was then added to the activated mixture in the dispersion cell. After it dispersed, thereby forming the reaction mixture, 20 V was applied. After about 10 minutes, the current increased slightly and light frothing in the cell contents was noticeable. At that point, the voltage remained at the same level for 25 additional minutes, for a total run time of 35 minutes. The voltage was then turned off.

The trap contents were analyzed. It contained unreacted Freon ® 113 which had been carried out of the dispersion cell by the sparging gas.

The cell contents were transferred to a separatory funnel and extracted three times with diethyl ether. The ether extract evaporated to dryness.

The aqueous phase was colorless. The AgNO$_3$ test resulted in both AgCl and AgF precipitates. The glass-etching test showed the presence of a fluoride ion. The presence of chloride ions and fluoride ions was confirmed by ion chromatography.

It is understood that man other changes and additional modifications of the invention are possible in view of the teachings herein without departing from the scope of the invention as defined in the appended claims.

What is claimed is:

1. A method for reacting at least one reactant comprising the steps of:
   (a) bringing the at least one reactant in contact with at least one reaction enhancer in a fluidic medium to form a reaction mixture of low ionic strength, said at least one reaction enhancer being a stable, non-soluble, porous, electronically non-conductive solid;
   (b) subjecting said reaction mixture to an electrifying force thereby forming a product by reaction of the at least one reactant, said subjection being carried out in such a manner that said at least one reaction enhancer enhances the reaction of the at least one reactant to form the product; and
   (c) collecting the product.

2. The method according to claim 1 wherein said reaction mixture has solutional ionic concentration of less than 0.025 molar.

3. The method according to claim 2 wherein said reaction mixture has solutional ionic concentration of less than 0.005 molar.

4. The method according to claim 1 wherein said fluidic medium is an aqueous liquid.

5. The method according to claim 4 wherein said at least one reaction enhancer is selected from the group consisting of metallocyano-derived lattices, borides, phosphides, nitrides, carbides, and silicides, compounds thereof, and mixtures thereof.

6. The method according to claim 4 wherein said at least one reaction enhancer is selected from the group consisting of aluminum oxide, silicon oxide, oxides of transition metals, and mixtures thereof.

7. The method according to claim 6 wherein said at least one reaction enhancer is selected from the group consisting of γ-alumina, α-alumina, kaolin, silica, and mixtures thereof.

8. The method according to claim 4 wherein said at least one reaction enhancer is a zeolite selected from the group consisting of faujasite, faujasite-type structures, and zeolite A and mixtures thereof.

9. The method according to claim 4 wherein said electrifying force produces an electric field in said reaction mixture.

10. The method according to claim 4 wherein said electrifying force produces an electric potential of at least 10 Volts across said reaction mixture.

11. The method according to claim 5 wherein said electrifying force produces an average electric field of at most 1000 V/cm in said reaction mixture.

12. The method according to claim 4 wherein said electrifying force produces a current across said reaction mixture.

13. The method according to claim 4 wherein said electrifying force produces a current density of at most 10 mA/cm$^2$ in said reaction mixture.

14. The method according to claim 4 wherein said electrifying force is applied across two or more electrodes and at least one of said electrodes contain material selected from the group consisting of platinum, gold, stainless steel, graphite, titanium, titanium oxide, ruthenium oxide, tantalum, and mixtures thereof.

15. The method according to claim 14 wherein at least one of said electrodes is at least 50% platinum.

16. The method according to claim 14 wherein at least one of said electrodes is coated with a platinum film.

17. The method according to claim 15 wherein at least one of said electrodes is a cathode having a water-permeable coating containing a path for ions.

18. The method according to claim 4 further comprising the step of dispersing the at least one reactant and said at least one reaction enhancer dispersed in said fluidic medium.

19. The method according to claim 4 wherein said at least one reaction enhancer supports one or more reaction catalysts.

20. The method according to claim 19 wherein said reaction catalyst is electronically non-conductive.

21. A method for reacting at least one reactant comprising the steps of:
   (a) dispersing at least one reaction enhancer in a fluidic medium to form a preactivation mixture, said dispersal occurring in the absence of the at least one reactant, said at least one reaction enhancer being a stable, non-soluble, porous, electronically non-conductive solid;
   (b) subjecting and preactivation mixture to a first electrifying force in the absence of the at least one reactant until said preactivation mixture reaches ionic equilibrium, thereby forming an activated mixture of low ionic strength;
   (c) dispersing the at least one reactant in said activated mixture to form a reaction mixture of low ionic strength;
   (d) subjecting said reaction mixture to a second electrifying force thereby forming a product by reaction of the at least one reactant, said subjection being carried out in such a manner that said at least one reaction enhancer enhances the reaction of the at least one reactant to form the product; and
   (e) collecting the product.

22. The method according to claim 21 wherein said preactivation mixture and said reaction mixture each has solutional ionic concentration of less than 0.025 molar.

23. The method according to claim 21 wherein said preactivation mixture and said reaction mixture each has solutional ionic concentration of less than 0.005 molar.

24. The method according to claim 21 wherein said fluidic medium is an aqueous liquid.

25. The method according to claim 21 wherein said at least one reaction enhancer is selected from the group consisting of metallocyano-derived lattices, borides, phosphides, nitrides, carbides, and silicides, compounds thereof, and mixtures thereof.

26. The method according to claim 24 wherein said at least one reaction enhancer is selected from the group consisting of aluminum oxide, silicon oxide, oxides of transition metals, and mixtures thereof.

27. The method according to claim 26 wherein said at least one reaction enhancer is selected from the group consisting of γ-alumina, α-alumina, kaolin, silica, and mixtures thereof.

28. The method according to claim 24 wherein said at least one reaction enhancer is a zeolite selected from the group consisting of faujasite, faujasite-type structures, and zeolite A and mixtures thereof.

29. The method according to claim 24 wherein said second electrifying force produces an electric field in said reaction mixture.

30. The method according to claim 24 wherein said second electrifying force produces an electric potential across said reaction mixture.

31. The method according to claim 24 wherein said second electrifying force produces an average electric field of at most 1000 V/cm in said reaction mixture.

32. The method according to claim 24 wherein said second electrifying force produces a current across said reaction mixture.

33. The method according to claim 24 wherein said second electrifying force produces a current density of at most 10 mA/cm$^2$ in said reaction mixture.

34. The method according to claim 24 wherein said second electrifying force is applied across two or more electrodes and at least one of said electrodes contain material selected from the group consisting of platinum, gold, stainless steel, graphite, titanium, titanium oxide, ruthenium oxide, tantalum, and mixtures thereof.

35. The method according to claim 34 wherein at least one of said electrodes is at least 50% platinum.

36. The method according to claim 34 wherein at least one of said electrodes is coated with a platinum film.

37. The method according to claim 34 wherein at least one of said electrodes is a cathode having a water-permeable coating containing a path for ions.

38. The method according to claim 24 further comprising the step of dispersing the at least one reactant and said at least one reaction enhancer dispersed in said fluidic medium.

39. The method according to claim 24 wherein said at least one reaction enhancer supports one or more reaction catalysts.

40. The method according to claim 39 wherein said reaction catalyst is electronically non-conductive.

41. The method according to claim 12 wherein said electrifying force produces an electric current of at most 2 Amp across said reaction mixture.

42. The method according to claim 32 wherein said second electrifying force produces an electric current of at most 2 Amp across said reaction mixture.

43. The method according to claim 15 wherein said at least one of said electrodes containing at least 50% platinum is an anode.

44. The method according to claim 35 wherein said at least one of said electrodes containing at least 50% platinum is an anode.

45. The method according to claim 16 wherein said at least one of said electrodes having a platinum film is an anode.

46. The method according to claim 36 wherein said at least one of said electrodes having a platinum film is an anode.

47. The method according to claim 9 wherein said electrifying force produces an electric field of at least 2.5 mV/cm in said reaction mixture.

48. The method according to claim 29 wherein said second electrifying force produces an electric field of at least 2.5 mV/cm in said reaction mixture.

49. The method according to claim 9 wherein said electrifying force produces an electric field of at least 25 mV/cm in said reaction mixture.

50. The method according to claim 29 wherein said second electrifying force produces an electric field of at least 25 mV/cm in said reaction mixture.

51. The method according to claim 30 wherein said second electrifying force produces an electric potential of at least 10 Volts across said reaction mixture.

* * * * *